UNITED STATES PATENT OFFICE.

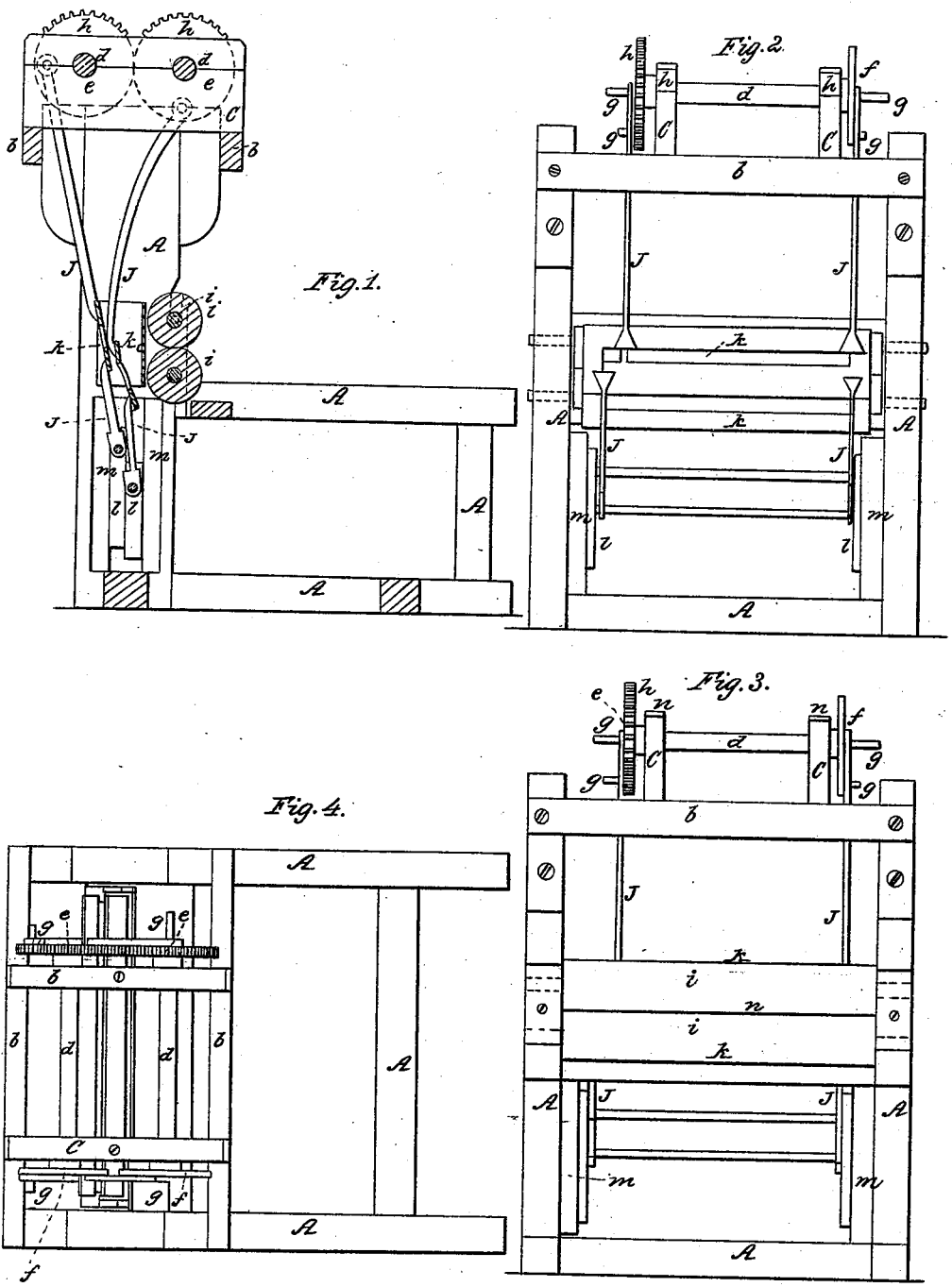

GEORGE W. BILLINGS, OF NEW YORK, N. Y.

IMPROVEMENT IN MACHINES FOR BREAKING FLAX AND HEMP.

Specification forming part of Letters Patent No. 41,903, dated March 15, 1864; antedated February 28, 1864.

*To all whom it may concern:*

Be it known that I, GEO. W. BILLINGS, of the city, county, and State of New York, have invented a new and useful Improvement in Breaking Flax and Hemp; and I do hereby declare that the following is a full, clear, and exact description thereof, reference being had to the accompanying drawings, and to the letters of reference marked thereon, making a part of this specification.

The nature of my invention consists in constructing a machine with smooth and fluted rollers in the ordinary manner for crushing and breaking the straw or stalk of flax or hemp, and adding thereto a pair of smooth rollers, with a delivering throat or thorax which receives the straw or stalks from the smooth rolls. In front of this I arrange two knives or scrapers extending across the machine, and each attached at both ends to pitmen or crank-rods. The upper ends of these rods are attached to cranks, one at each end of a revolving shaft. The lower ends are fastened to horizontal bars, which constitute the scrapers, hereinafter described. These scrapers have connecting-rods, by which they are each attached at both ends to slides reciprocating in vertical grooves upon the lower part of the frame. It will be observed from the drawings that these scrapers are constructed in a quadrangular form; but I would state that this is merely for the sake of greater strength and firmness, one only of the horizontal bars in each quadrangle constituting the scraper, the other merely performing the function of a brace. In the one nearest the feed-rolls the lower bar is the scraper and the upper one the brace. In the front gate the upper bar is the scraper and the lower one the brace. The knives are fastened to the pitmen about two-thirds the distance from the crank-pins to the lower fastening, and so arranged that one of them strikes the material after it passes through the throat on the lower side. The other is so arranged as to strike the material on the upper side, the pitmen having a circular movement at the top and a vertical movement at the lower end. The point where the knives are fastened describes a path which is nearly elliptical, the knives or scrapers striking the material close up to the throat, and being moved outward from the throat by the pitmen giving the breaking and scraping motion desired. The front of the throat is faced up perfectly true and lined with steel. The scraping-knives are made of steel of the best quality, the edges of which may be smooth, as shown in the drawings; but I prefer the edges to be toothed or scalloped, it being found more efficient in working on the fiber and removing the wood.

Figure 1 is a side view. Fig. 2 is a front view. Fig. 3 is a rear view, and Fig. 4 is a top view.

A A A A, Fig. 1, is the frame; $b\ b$, the top girths that hold the shafts; $c$, the cross-pieces to which the journal-box is fastened, if made of metal; but if made of wood it is the journal-box. $d\ d$ are the shafts to which are secured the gearing and the cranks. $e\ e$ is the gearing. $f\ f$ are the end plates on the shafts $d\ d$, to receive and hold the crank-pins. $g\ g$ are the crank-pins. $h$ is the cap-piece over the journals, and fastened to the piece $c$. $i\ i$ are the smooth rollers that deliver the material to the scraping knives. $j\ j\ j\ j$ are the pitmen or crank-rods that give motion to the knives. $k\ k$ are the scraping-knives. $l\ l$ are the guides to which the pitmen are fastened. $m\ m$ are the stationary guides that hold the movable guides $l\ l$. $o$ is the throat.

The operation of the machine is simple. The material is spread on an apron in the rear of the usual smooth and fluted rolls, which, as they form no part of my invention, I have not shown or described. The apron traverses about twelve feet per minute, the material passing from the apron between the smooth and fluted rollers, and being received by the smooth rollers behind the throat, and which deliver the material to the scraping-knives, which strike it alternately and scrape it conjointly.

I am aware that scrapers having an up and down and forward and back motion, by means of cranks and slides are shown in Jas. Anderson's patent of November 13, 1849.

I am also aware that in Robert Heneage's patent of January 22, 1861, are shown crank-rods operating two scrapers which act upon opposite sides of the material simultaneously.

I do not claim anything contained in either of these patents; but

What I do claim is—

The knives or scrapers $k$, having the compound motion herein described, in combination with the stationary aperture or throat $o$ and smooth feed-rollers $i\,i$, the whole constructed substantially as and for the purpose set forth.

GEORGE W. BILLINGS.

Witnesses:
JOHN S. HOLLINGSHEAD,
R. J. SHEKELL.